United States Patent [19]

Shiraishi

[11] Patent Number: 5,146,320
[45] Date of Patent: Sep. 8, 1992

[54] COLOR IMAGE PICKUP APPARATUS
[75] Inventor: Akihiko Shiraishi, Kawasaki, Japan
[73] Assignee: Canon Kabushiki Kaisha, Tokyo, Japan
[21] Appl. No.: 741,065
[22] Filed: Aug. 6, 1991
[30] Foreign Application Priority Data Aug. 8, 1990 [JP] Japan .................. 2-208241
Oct. 30, 1990 [JP] Japan .................. 2-290814

[51] Int. Cl.$^5$ .......................................... H04N 9/07
[52] U.S. Cl. ............................ 358/44; 358/225
[58] Field of Search ............ 358/41, 43, 44, 47, 358/225

[56] References Cited

U.S. PATENT DOCUMENTS

| | | | |
|---|---|---|---|
| 4,670,777 | 6/1987 | Ishikawa | 358/44 |
| 4,795,236 | 1/1989 | Ise | 358/44 |
| 4,845,548 | 7/1989 | Kohno | 358/47 |
| 4,878,737 | 11/1989 | Ise | 358/44 |
| 4,998,800 | 3/1991 | Nishida | 358/47 |
| 5,063,439 | 11/1991 | Tabei | 358/41 |

FOREIGN PATENT DOCUMENTS 0253990 11/1986 Japan .

*Primary Examiner*—Howard W. Britton
*Attorney, Agent, or Firm*—Robin, Blecker, Daley & Driscoll

[57] ABSTRACT

A color image pickup apparatus having: an image pickup device in which a color filter array is provided, the color filter array being composed of color filters of three or more colors disposed in such a manner that, assuming that the horizontal scanning directional pitch of the color filters is $P_H$ and the vertical scanning directional pitch of the same is $P_V$, the color filters of the same color are disposed at a horizontal scanning directional pitch of $2P_H$ and a vertical scanning directional pitch of $2P_V$ while being offset by $P_H$ in the horizontal scanning direction.

8 Claims, 14 Drawing Sheets

FIG. 1A

|  | | COLUMN | 1 | 2 | 3 | 4 | 5 | 6 | |
|---|---|---|---|---|---|---|---|---|---|
| ODD | EVEN | ROW | $P_H$ | | | | | | |
| ← | | 1 $P_v$ | R | G | R | G | R | G | ------ |
| | ← | 2 | R | G | R | G | R | G | ------ |
| ← | | 3 | B | G | B | G | B | G | ------ |
| | ← | 4 | B | G | B | G | B | G | ------ |
| ← | | 5 | R | G | R | G | R | G | ------ |
| | ← | 6 | R | G | R | G | R | G | ------ |
| ← | | 7 | B | G | B | G | B | G | ------ |
| | | ⋮ | ⋮ | ⋮ | ⋮ | ⋮ | ⋮ | ⋮ | |
| | | Z-1 | | | | | | | |
| | ← | Z | B | G | B | G | B | G | ------ |

FIG. 1B

|  | | COLUMN | 1 | 2 | 3 | 4 | 5 | 6 | |
|---|---|---|---|---|---|---|---|---|---|
| ODD | EVEN | ROW | $P_H$ | | | | | | |
| ← | | 1 $P_v$ | Mg+Ye | G+Cy | Mg+Ye | G+Cy | Mg+Ye | G+Cy | ------ |
| | ← | 2 | Mg+Ye | G+Cy | Mg+Ye | G+Cy | Mg+Ye | G+Cy | ------ |
| ← | | 3 | G+Ye | Mg+Cy | G+Ye | Mg+Cy | G+Ye | Mg+Cy | ------ |
| | ← | 4 | G+Ye | Mg+Cy | G+Ye | Mg+Cy | G+Ye | Mg+Cy | ------ |
| | | ⋮ | ⋮ | ⋮ | ⋮ | ⋮ | ⋮ | ⋮ | |

|  | COLUMN 1 | 2 | 3 | 4 | 5 | 6 | ---------- | 640 |
|---|---|---|---|---|---|---|---|---|
| ODD | EVEN | ROW | $P_H$ |  |  |  |  |  |

| ROW |  |  |  |  |  |  |  |  |
|---|---|---|---|---|---|---|---|---|
| 1 | R | $G_1$ | R | $G_1$ | R | $G_1$ | ---------- | $G_1$ |
| 2 | B | $G_2$ | B | $G_2$ | B | $G_2$ | ---------- | $G_2$ |
| 3 | $G_1$ | R | $G_1$ | R | $G_1$ | R | ---------- | R |
| 4 | $G_2$ | B | $G_2$ | B | $G_2$ | B | ---------- | B |
| 5 | R | $G_1$ | R | $G_1$ | R | $G_1$ | ---------- | $G_1$ |
| 6 | B | $G_2$ | B | $G_2$ | B | $G_2$ | ---------- | $G_2$ |
| 7 | $G_1$ | R | $G_1$ | R | $G_1$ | R | ---------- | R |
| ⋮ 481 | | | | | | | | |
| 482 | B | $G_2$ | B | $G_2$ | B | $G_2$ | ---------- | $G_2$ |

● : BASEBAND
○ : CARRIER OF LUMINANCE SIGNAL
△ : CARRIER OF CHROMINANCE SIGNAL

FIG. 14

| COLUMN | 1 | 2 | 3 | 4 | 5 | 6 | ---------------- | 764 |
|---|---|---|---|---|---|---|---|---|
| ROW 1 | Gr | Mg | Gr | Mg | Gr | Mg | ---------------- | Mg |
| 2 | Ye | Cy | Ye | Cy | Ye | Cy | ---------------- | Cy |
| 3 | Mg | Gr | Mg | Gr | Mg | Gr | ---------------- | Gr |
| 4 | Cy | Ye | Cy | Ye | Cy | Ye | ---------------- | Ye |
| 5 | Gr | Mg | Gr | Mg | Gr | Mg | ---------------- | Mg |
| 6 | Ye | Cy | Ye | Cy | Ye | Cy | ---------------- | Cy |
| 7 | Mg | Gr | Mg | Gr | Mg | Gr | ---------------- | Gr |
| ⋮ | | | | | | | | |
| 481 | | | | | | | | |
| 482 | Ye | Cy | Ye | Cy | Ye | Cy | ---------------- | Cy |

$P_H$, $P_V$

- • ---- BASEBAND
- ○ ---- CARRIER OF LUMINANCE SIGNAL
- △ ---- CARRIER OF CHROMINACE SIGNAL

COLOR IMAGE PICKUP APPARATUS

BACKGROUND OF THE INVENTION

1. Field of the Invention

The present invention relates to a color image pickup apparatus such as a still video camera and a video camera.

2. Related Background Art

Hitherto, in order to frame-photograph (obtain odd and even field information items) a still image by a still video camera or the like, there has been a necessity of using a color filter image pickup device having a color filter which is operated at a period of two pixels as shown in FIGS. 1A and 1B. The reason for this is in that it is necessary to make the outputs from the odd fields and even fields the same because the conventional image pickup device alternately reads the odd rows and even rows as shown in FIGS. 1A and 1B.

However, if the image pickup device having the color filter arranged as shown in FIGS. 1A and 1B is used, a luminance signal and a chrominance signal can be deduced by using data of two rows positioned alternately, for example, the first and third rows in the odd field. The second and fourth rows in the even field must be used. As a result, the vertical directional distance between data items is enlarged, causing the correlation in the vertical direction to be reduced. Therefore, the quantity of generation of pseudo color undesirably increases.

Another problem arises in that a multiplicity of 1H (horizontal scanning period) delay lines are necessary to deduce the luminance signal and the chrominance signal for use in the signal process.

FIG. 2 illustrates the positions at which carrier components are generated in the vicinity of the base band of an image pickup device provided with the above-described color filter. In either of the cases shown in FIGS. IA and IB, the carrier of the luminance signal is generated at positions ($\pm 1/PH$, 0) assuming that the horizontal scanning directional pitch of the color filters of the image pickup device is PH. Furthermore, the carrier of the chrominance signal is generated at positions ($\pm \frac{1}{2}PH$, 0) because the pitch of the filters of the same color disposed in the horizontal direction is 2PH.

The luminance signal obtainable from the above-described image pickup device is arranged to have its band to a frequency of $\frac{1}{2}PH$ in accordance with the theorem of sampling. Therefore, in order to prevent the reflected distortion of the luminance signal, it is ideal that the optical low-pass filter to be disposed in front of the image pickup device is able to make all of the frequency components higher than $\frac{1}{2}PH$ to be zero. However, the carrier of the chrominance signal is generated at the horizontal frequency $fH = \pm \frac{1}{2}PH$ as shown in FIG. 3. As a result, if the optical low-pass filter having the above-described frequency characteristics is used, the pseudo color is generated due to the reflection of the chrominance signal. Therefore, as shown in FIG. 3, the frequency characteristics of the optical low-pass filter must have the band which is lower than $fH = \frac{1}{2}P_H$ by a degree corresponding to the chrominance signal. As a result, a problem arises in that the obtainable resolution is lower than the principle resolution limit.

FIG. 4A illustrates the structure of a conventional optical low-pass filter for use in a solid image pickup device in which the color filters are arranged as shown in FIG. 1. Referring to FIG. 4A, an optical low-pass filter 70 comprises a birefringence plate 71 for dividing a light beam into two beams, the light beam being a beam made incident upon by making an angle of 90° from the horizontal direction by a distance of PH. The low-pass filter 70 further comprises a phase plate 72 for converting linearly polarized light into circularly polarized light. The low-pass filter 70 further comprises another birefringence plate 73 for dividing a light beam into two beams, the light beam being a beam made incident upon by making an angle of 90° from the horizontal direction by a distance of PH/2. The transfer characteristic (MTF) H1 of the above-described optical low-pass filter is expressed by the following equation:

$$H1\ (fx, fy) = |\cos (\pi/2\ PH\ fx) \cdot \cos (\pi PH\ fx)| \qquad (1)$$

The above-described characteristic can be graphed as shown in FIG. 4B. The characteristic on the frequency space is as shown in FIG. 4C. Dotted lines 74a, 74b, 75a and 75b show the frequencies at which the optical low-pass filter 70 traps. As can be seen from FIG. 4C, carrier frequency $fH = \pm 1/PH$ of the luminance signal and carrier frequency $fH = \pm \frac{1}{2}PH$ of the chrominance signal are trapped. As can be seen from Equation (1) or FIG. 4B, the optical low-pass filter having the above-described characteristics is as follows: the MTF is 0 at the carrier frequency $fH = \pm \frac{1}{2}PH$ of the chrominance signal; and the transference characteristic is $-15$ dB at about 85 of the frequency. Therefore, the number of the resolution lines to the resolution limit $fH = \frac{1}{2}PH$ cannot be obtained.

SUMMARY OF THE INVENTION

To this end, an object of the present invention is to provide a color image pickup device in which generation of false color can be prevented, resolution of the luminance signal can be obtained to the theorical limit and a frame image can be formed.

In order to achieve the above-described object, the color image pickup apparatus according to the present invention is constituted as any one the following structures (1) to (7):

(1) A color image pickup apparatus having an image pickup device in which a color filter array a is provided:
  a. a color filter array composed of color filters of three or more colors disposed in such a manner that, assuming that the horizontal scanning directional pitch of the color filters is PH and the vertical scanning directional pitch of the same is Pv, the color filters of the same color are disposed at a horizontal scanning directional pitch of 2PH and a vertical scanning directional pitch of 2PH while being offset by PH in the horizontal scanning direction.

(2) A color image pickup apparatus according to (1) including: an image pickup device having an optical low-pass filter provided on the front surface thereof, the optical low-pass filter being constituted by laminating a first optical member for dividing a light beam made incident upon by distance $P_1$ while making an angle of 45° from the horizontal scanning direction into two light beams, a second optical member for dividing a light beam made incident upon by distance P2 while making an angle of 90° from the horizontal scanning direction into two light beams and a third optical member for dividing a light beam made incident upon by distance P1 while making an angle of 135° from the horizontal scanning direction into two light beams, the optical low-pass filter disposed to meet the following conditions:

$$\frac{3\sqrt{2}\, P_H P_V}{2(P_H + 2P_V)} < P_1 < \frac{3\sqrt{2}\, P_H P_V}{P_H + 2P_V} \text{ and}$$

$$P_2 < P_H.$$

(3) A color image pickup apparatus having a color filter array, from which the carrier of a chrominance signal is not generated and which is disposed on the horizontal frequency axis in a 2D-frequency space arranged in the horizontal direction and the vertical direction.

(4) A color image pickup apparatus according to (3) and having an optical low-pass filter for trapping a portion in the vicinity of the position of the carrier of a luminance signal and that of a chrominance signal in a 2D-frequency space arranged in the horizontal direction and the vertical direction, wherein the optical low-pass filter is disposed on the front surface of the image pickup device.

(5) A color image pickup apparatus according to any one of (1), (2), (3) and (4), wherein an output from the image pickup device is temporarily recorded in a memory so that frame information is formed in response to a read signal from the memory.

(6) A color image pickup apparatus having the following elements a, b and c:
- a: an image pickup device in which the horizontal directional pixel pitch is PH and the vertical directional pixel pitch is Pv;
- b: a color filter array formed into an offset structure and provided for the image pickup device, the color filter array being composed of color filters of three or more colors disposed in such a manner that the color filters of the same color are disposed at a horizontal scanning directional pitch of 2PH and a vertical scanning directional pitch of 2Pv while being offset by PH in the horizontal scanning direction.
- c: an optical low-pass filter composed of; a first optical member for dividing an incidental light beam into two light beams away from each other in a direction of 45° from the horizontal direction by distance P; and a second optical member for dividing an incidental light beam into two light beams away from each other in a direction of 90° from the direction in which the first optical member divides the light beam by distance P, the optical low-pass filter being provided for an image pickup optical system and meeting the following conditions:

$$\frac{3\sqrt{2}\, P_H P_V}{2(P_H + 2P_V)} < P < \frac{3\sqrt{2}\, P_H P_V}{P_H + 2P_V}$$

(7) A color imaging apparatus according to (6) further comprising a signal processing means constituted by a memory for temporarily storing an output from the image pickup device and a control portion for controlling the memory, the signal processing means forming frame information from the contents stored in the memory.

According to the embodiments (1) to (7), the resolution limit of fH = ½PH can be obtained by virtue of the provided color filter array formed into the offset structure. The carrier of the chrominance signal can be deleted by the optical low-pass filter so that generation of false color is prevented. Furthermore, according to the structures (5) and (7), frame information can be formed by the provided signal processing means.

Other and further objects, features and advantages of the invention will appear more fully from the following description.

BRIEF DESCRIPTION OF THE DRAWINGS

FIGS. 1A and 1B illustrate an example of the arrangement of color filters according to a conventional structure;

FIG. 14 illustrates the arrangement of the color filters according to the second embodiment of the present invention;

DETAILED DESCRIPTION OF THE PREFERRED EMBODIMENTS

Preferred embodiments of the present invention will now be described.

Figures 5, 6:
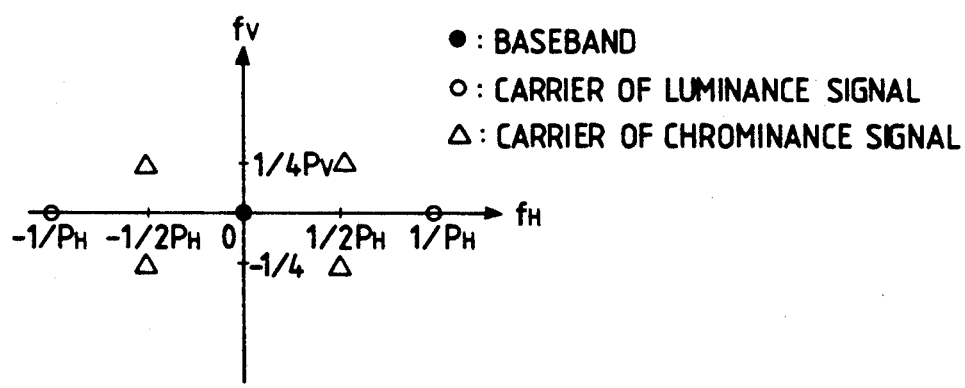
FIG. 5 illustrates the arrangement of color filters according to a first embodiment of the present invention.
FIG. 6 illustrates the frequency spatial characteristics according to the first embodiment of the present invention.

FIG. 5 illustrates the arrangement of color filters for use in a color image pickup apparatus according to a first embodiment of the present invention. The overall body of the color filter is called a "color filter array" hereinafter.

As shown in FIG. 5, a color filter array 1b (see FIG. 8) is composed of pure R, G and B filters. Assuming that the horizontal directional pitch of the color filters is PH and the vertical directional pitch of the same is Pv, the color filters R, G1, G2 and B of the corresponding colors are formed into an offset sampling structure which is arranged in such a manner that they are disposed at a horizontal directional pitch of 2PH, a vertical directional pitch of 2Pv having a horizontal directional offset quantity of PH.

Figure 2:
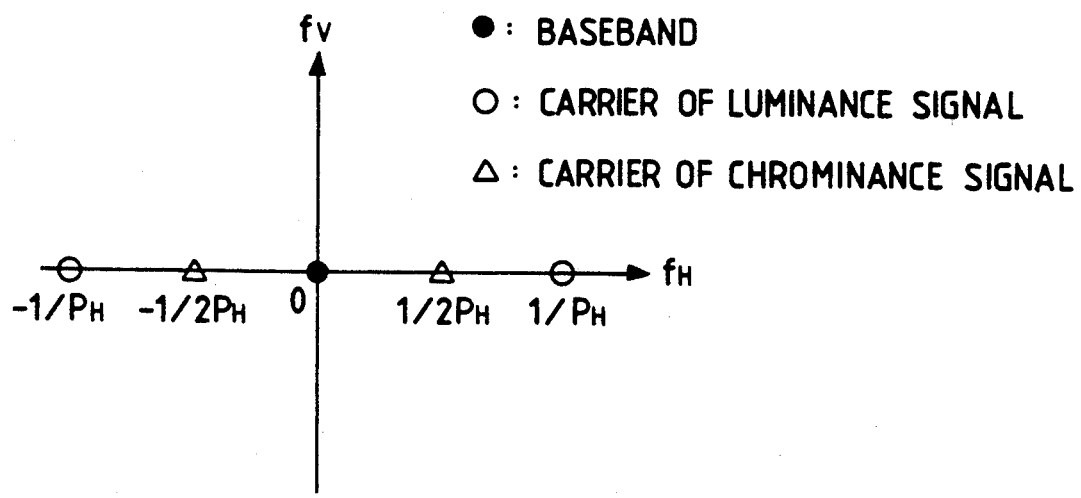
FIG. 2 illustrates frequency spatial characteristics of the conventional structure.
Figure 3:
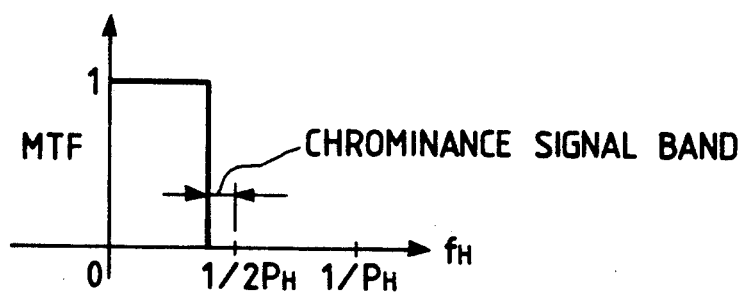
FIG. 3 illustrates the characteristics of an optical low-pass filter for use in the conventional structure.
Figure 4A:
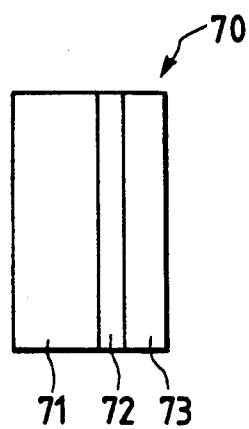
FIGS. 4A to 4C illustrate the operation of the optical low-pass filter for use in the conventional structure.
Figure 4B:
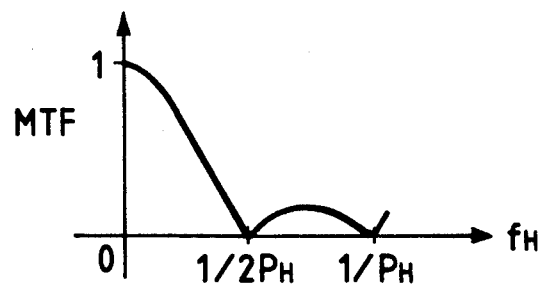
Figure 4C:
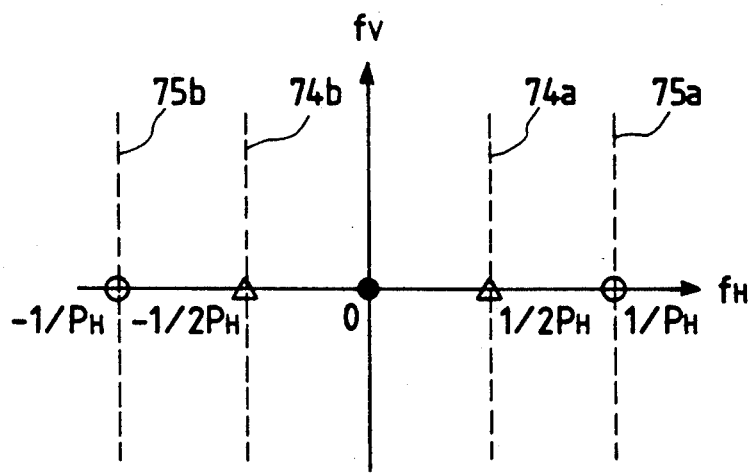

FIG. 2 illustrates the positions at which the carrier component is generated in the vicinity of the base band of the image pickup device which employs the color filter array structured as described above.

As shown in FIG. 2, the carrier of the luminance signal is generated at positions ($\pm 1/\text{PH}$, 0), while the carrier of the chrominance signal is generated at positions ($\pm\frac{1}{2}$Pa, $\frac{1}{2}$Pv). As can be clearly seen from a result of a comparison made with FIG. 2, the carrier of the chrominance signal is not present on the axis FH but is vertically shifted by a distance of $\pm\frac{1}{2}$PH. Therefore, it is disposed away from the base band, causing the generation of the pseudo color due to the reflection of the chrominance signal to be prevented. Furthermore, since there is no carrier signal of the chrominance signal on the fx axis, luminance signals can be obtained to the resolution limit frequency, that is, fH=$\frac{1}{2}$PH.

FIGS. 7A to 7D illustrate the structure of the optical low-pass filter according to this embodiment.

Figure 7A:
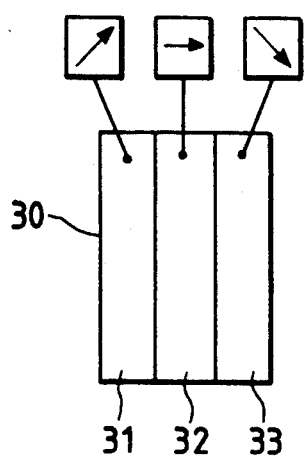
FIGS. 7A to 7D illustrate the operation of the optical low-pass filter for use according to the first embodiment of the present invention.
Figure 7B:
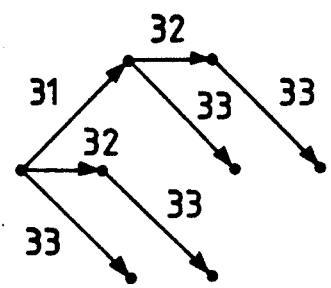
Figure 7C:
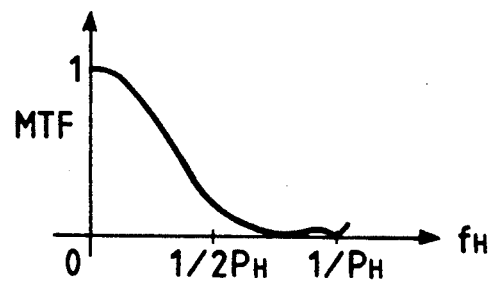
Figure 7D:
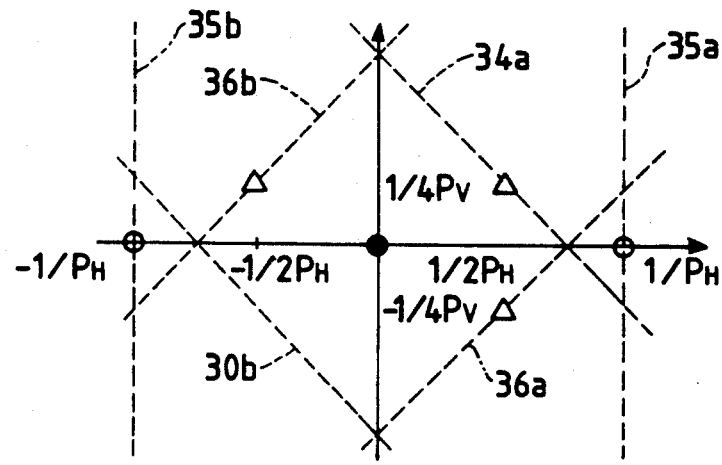

Referring to FIGS. 7A and 7D, an optical low-pass filter 30 comprises a first optical member composed of a birefringence plate 31 for dividing a light beam into two beams, the light beam being a beam made incident upon by making an angle of 45° from the horizontal direction by a distance of P1. The low-pass filter 30 further comprises a second optical member composed of a birefringence plate 32 for dividing a light beam into two beams, the light beam being a beam made incident upon by making an angle of 90° from the horizontal direction by a distance of P2. The low-pass filter 30 further comprises a third optical member composed of a birefringence plate 33 for dividing a light beam into two beams, the light beam being a beam made incident upon by making an angle of 135° from the horizontal direction by a distance of P1. Furthermore, the optical low-pass filter 30 meets the following conditions:

$$\frac{3\sqrt{2}\ P_H P_V}{2(P_H + 2P_V)} < P_1 < \frac{3\sqrt{2}\ P_H P_V}{P_H + 2P_V} \quad (2)$$

$$P_2 < P_H \quad (3)$$

If P1 exceeds the lower limit of Inequality (2), the generation of the reflection distortion, in particular, the generation of the pseudo color cannot be prevented. If the same exceeds the upper limit, a satisfactory resolution cannot be obtained. Furthermore, is P2 exceeds the upper limit of Inequality (3), a satisfactory resolution also cannot be obtained. The transfer characteristic (MTF) of the optical low-pass filter 30 can be expressed by the following equation:

$$H_2(f_x, f_y) = |\cos(\pi P_2 f_x) \cdot \cos\left(\pi P_1 \frac{f_x+f_y}{\sqrt{2}}\right) \cdot \cos\left(\pi P_1 \frac{f_x-f_y}{\sqrt{2}}\right)| \quad (4)$$

In a case of a frame of an NTSC system having an aspect ratio of 3:4, a solid image pickup device having about 640 effective pixels in the horizontal direction and about 480 effective pixels in the vertical, as shown in FIG. 5, holds the following relationship:

$$PH = Pv \quad (5)$$

According to this embodiment, the relationship is arranged as follows:

$$P_1 = \frac{2\sqrt{2}}{3} P_H,\ P_2 = \frac{P_H}{2} \quad (6)$$

The transfer characteristic with respect to the fx axis displayed by the structure constituted as described above is shown in FIG. 7C. The same in a two-dimensional frequency space is shown in FIG. 7D. Dotted lines 34a, 34b, 35a, 35b, 36a and 36c show the frequencies at which the optical low-pass filter 30 traps. As can be seen from FIG. 7D, the carrier frequencies of the luminance and chrominance signals are trapped. Furthermore, as can be seen from FIG. 7C, the frequency components higher than the resolution limit frequency fH=$\frac{1}{2}$PH are satisfactorily prevented. Therefore, the reflection distortion of the luminance can be prevented. In addition, as can be clearly seen from Equations (4), (5) and (6), the decay of the transfer characteristics is restricted within $-15$ dB in a frequency range of $|fH| \leq \frac{1}{2}P_H$. Therefore, the desired resolution can be substantially secured to the limit resolution frequency $\frac{1}{2}$PH.

A method of obtaining an image signal according to this embodiment will now be described.

Figure 8:
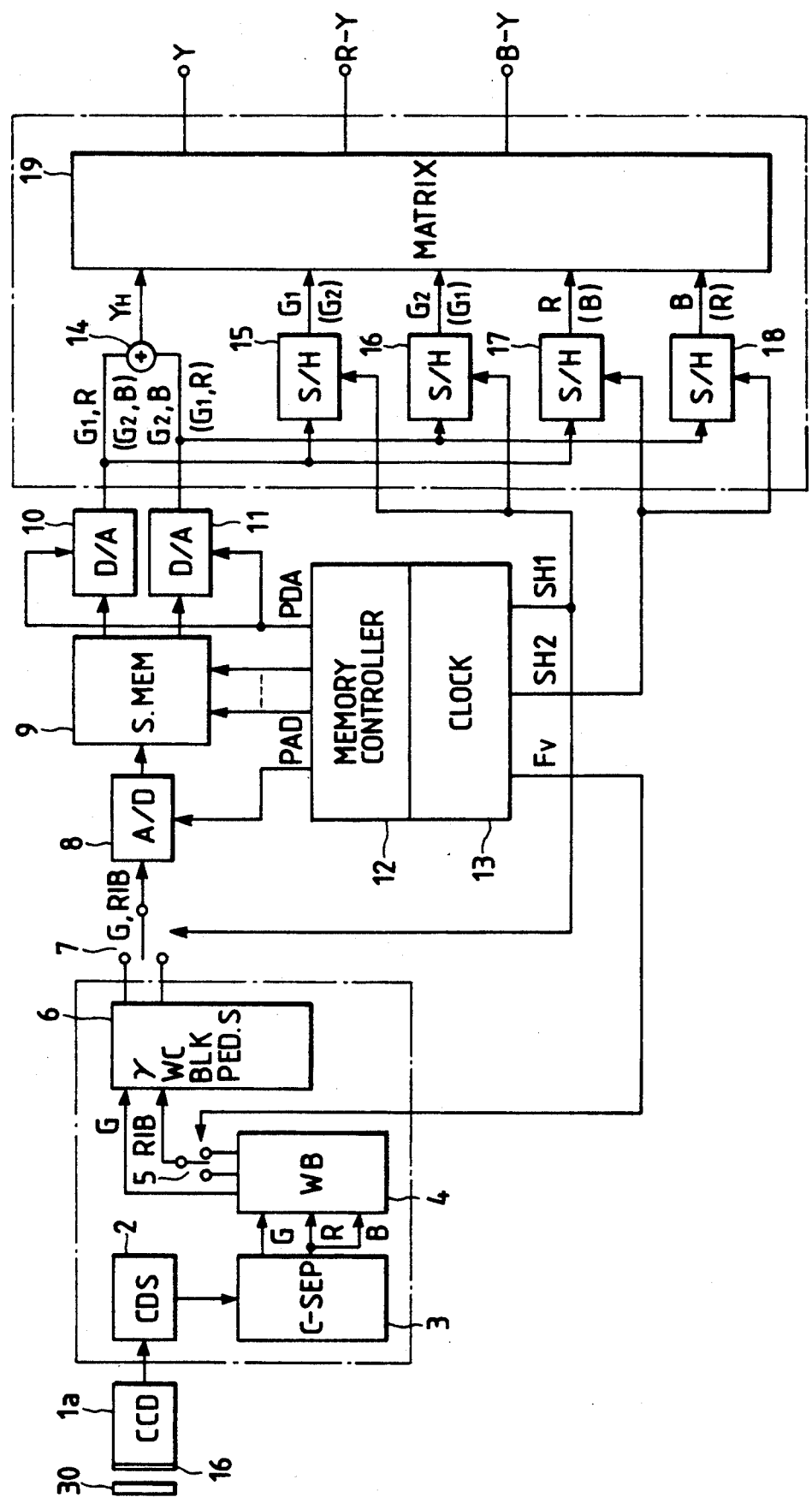
FIG. 8 is a block diagram which illustrates the overall structure according to the first embodiment of the present invention.

FIG. 8 is a block diagram which illustrates the overall structure according to this embodiment, where reference numeral 30 represents an optical low-pass filter. Reference numeral 1a represents a solid image pickup device CCD, 1b represents a color filter array provided for the solid image device 1a and 2 represents a correlation double sampling circuit. Reference numeral 3 represents a color separation circuit (C-SEP circuit) and 4 represents a WB block for white-balance-adjusting a signal which has been subjected to the color separation process. Reference numerals 5 and 7 represent switches for selecting either of the two outputs and 6 represents a signal processing block for performing a gamma process, a white clip process, a blanking process and a pedestal level setting process. Reference numeral 8 represents an analog-to-digital converter (A/D converter) and 9 represents a serial memory block. Reference numerals 10 and 11 represent digital-to-analog converters (D/A converters) and 12 represents a memory controller for controlling the analog-to-digital converter (A/D converter), the serial memory block and the D/A converter. Reference numeral 13 represents a clock generating circuit for generating a variety of pulses and 14 represents an adder. Reference numerals 15, 16, 17 and 18 represent sample holding circuits and 19 represents a matrix circuit for generating luminance signal (Y) and chrominance signals (R-Y, B-Y) from the outputs from the elements 14 to 18.

Figure 10:
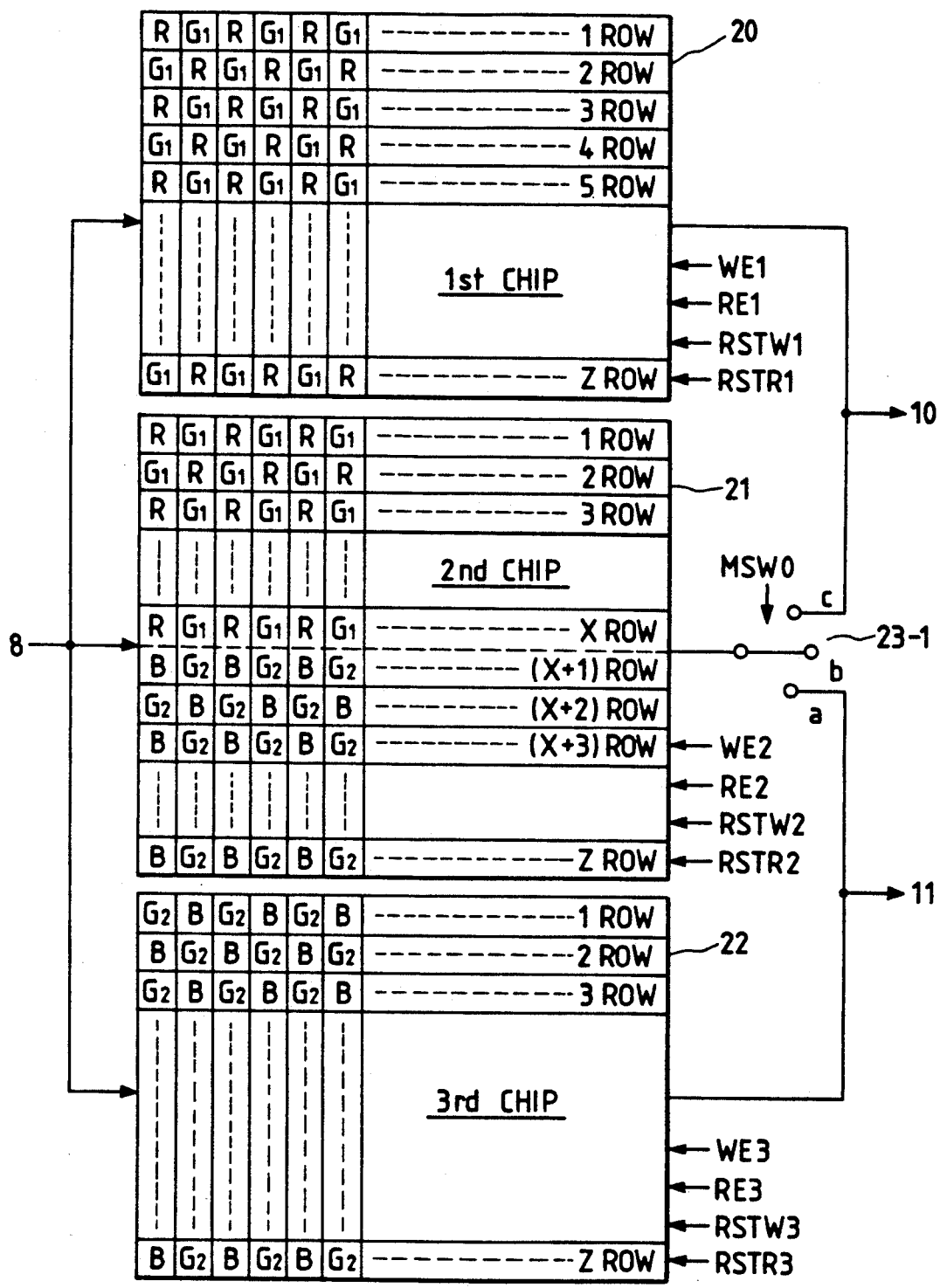
FIG. 10 is a first structural schematic view of a serial memory 9 according to the first embodiment of the present invention.
Figure 11:
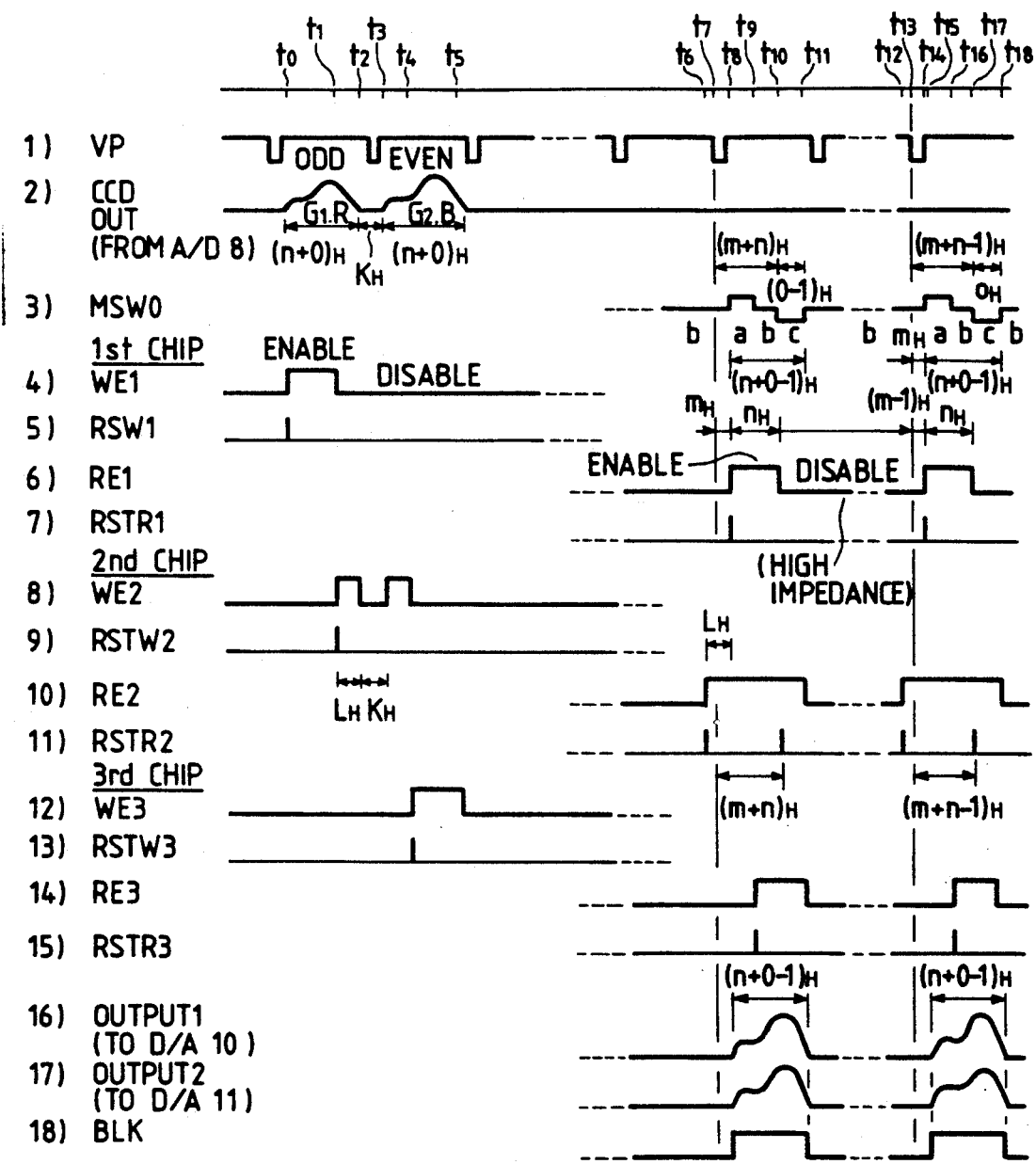
FIG. 11 is a timing chart of the memory shown in FIG. 10.

FIG. 10 is a structural schematic view which illustrates the serial memory block 9. FIG. 11 is a timing chart of the operation performed by the memory controller.

The operation of the present invention will now be described with reference to FIGS. 8, 10 and 11.

An image signal transmitted from the solid image pickup device shown in FIG. 8 is subjected to a process in which its reduction noise is eliminated by the correlation double sampling circuit 2 before it is supplied to the color separation circuit 3. The image output from the solid image pickup device 1a is separated into three primary color signals, that is, R, G and B signals by the color separation circuit 3. Then, the WB block 4 performs the white balance adjustment operation. However, since the solid image pickup device 1a is arranged in such a manner that the color filters thereof are arranged as shown in FIG. 5, only R and G signals can be obtained in the odd fields and only B and G signals can be obtained in the even fields. Therefore, the B signal transmitted from the WB block 4 in the odd field and the R signal transmitted from the WB block 4 in the even field are false information which cannot be used. Therefore, the switch 5 selects the R signal in the odd field while the same selects the B signal in the even field. Switching pulses Fv causing the above-described selection to be performed are transmitted from the clock generating circuit 13. Assuming that a signal defined by alternating the selected signals R and B at each IV (vertical scanning period) is expressed by R|B, symbol "|" is used to express the plane succession hereinafter.

Then, the RB signal, together with another output G from the WB block 4, is supplied to the signal processing block 6 so as to be subjected to the gamma, white clip, blanking and pedestal level setting processes.

The output G and the R|B signal transmitted from the signal processing block 6 are switched over in units of a pixel in response to pulse SHl by the switch 7 so that signal G1, R|G2, B (hereinafter abbreviated to "G, R|B)" which again corresponds to the color filter arrangement of the solid image pickup device 1, where mark "," shows that the subject signal is a dot successive signal. The SHl pulses are transmitted from the clock generating circuit 13.

The dot-successive signal G, R|B formed by means of the switch 7 is converted into a digital signal by the A/D converter 8 before it is supplied to the serial memory block (S. MEM) 9. Then, the two systems of the output from the serial memory block 9 are converted into analog signals by the D/A converters 10 and 11. At this time, clocks PAD and PDA for use in the A/D and D/A converters and the memory control pulse are transmitted from the memory controller 12.

The operation of the serial memory 9 will further be described with reference to FIGS. 10 and 11.

Referring to FIG. 10, reference numerals 20 to 22 represent serial memories (according to this embodiment, three chips are necessary to possess a memory capacity capable of storing data of all pixels of the CCD which is the solid image pickup device 1). Reference numeral 23-1 represents a switch for switching over the output from each of the memories so as to output it to the D/A converters 10 and 11. Since the input of the output from the CCD is commenced at to as shown in FIG. 11 (2), the output from the CCD is stored in a memory (1st Chip 20) of the first chip of the serial memory 9 in such a manner that the level of write enable signal WEI is raised so that the memory 20 is enabled. Furthermore, write reset signal RSTW1 is used to reset the write address of the memory so that writing is commenced at address zero (the left end portion of the first row designated by reference numeral 20 shown in FIG. 10). As a result, a (B, R) signal of the CCD output (odd field) shown in FIG. 10 (2) is stored on the memory 20 shown in FIG. 10 as illustrated. Then, the level of the write enable signal WEI is lowered when the storage capacity of the memory has been filled at t1. As a result, the memory 20 is disabled. At this time, in response to the enable signal WE2 shown in FIG. 11, the memory (2nd Chip 21) of the second chip of the serial memory 9 is enabled so that output signals in the CCD odd fields ensuing t1 are, as shown in FIG. 10, stored starting from address zero in response to the output pulse RSTW2 shown in (9). Then, the level of the write enable signal WE2 is lowered in blanking period Kx before time t3 at which the odd field starts so as to maintain the address at t2. As a result, writing to the memory 21 is inhibited. In a case where each of the memories 20, 21 and 22 is a serial dynamic memory arranged to have the blanking period KH which is longer than predetermined time Ko, a resetting operation is sometimes necessary. Therefore, the blanking period KH of the CCD image output is set to be shorter than a time in which data can be held while holding the address (KH<KO). Even if KH is set regardless of the TV-rate V blanking period so as to perform writing to the memory, no problem takes place by making it to be the normal V blanking period at the time of the reading operation.

When the image period of the even field is commenced at t3, the level of the write enable signal WE2 shown in FIG. 11 (8) is again raised so that data of the signal (G2, B) is written to time t4 at which the capacity of the memory 21 is filled. At time t4, the level of the write enable signal WE2 is lowered so as to disable the memory 21. Then, the level of the write enable signal WE3 shown in (12) is raised so as to generate pulse RSTW3 shown in (13). As a result, even field image signals ensuing from t4 are written to a memory (3rd Chip) 22 of the third chip. Simultaneously with the completion of the even field image signals at time t5, the memory 22 is disabled in response to the write enable signal WE3 so that the writing operation is completed.

The reading operation from the serial memory 9 will now be described. First, the switch 23-1 is brought to an open state by bringing it into contact with b. At time t6, the level of read enable signal RE2 shown in (10) is raised so as to output read reset pulse RSTR2 shown in (11). As a result, reading of the memory 21 is commenced. At this time, the switch 23-1 is opened and the output from each of the memories 20 and 22 is in a high impedance state because the level of each of the read enable signals RE1 and RE3 is low. Therefore, no signal is transmitted to 10 and 11. Then, the level of the RE1 is raised at ts so that the pulse RSTRl is transmitted. As a result, data in the memory 20 is read out so as to be transmitted to 10. Simultaneously, the switch 23-1 is connected to a, the output from the memory 21 is read to be supplied to 11. At this time, since the address of the memory 21 has been proceeded by 1H, address for data stored (X rows from the first row) in a period between t1 and t2 of the WE2 shown in (8) has been proceeded. Therefore, the address shows (G2, B) data starting row (X+1) of 21, causing the (G2, B) signal to be transmitted to 11. Then, the switch 23-1 is connected to b at t9 so as to be opened. Furthermore, the level of the RE3 is raised so as to output pulse RSTR3. As a result, data-reading of the memory 22 is commenced. Therefore, data (G2, B) output from the memory 22 is supplied to 11. At t10, the switch 23-1 is connected to c so that the RSTR2 pulse is again transmitted, causing a signal from the address zero to be transmitted to 10. At t11, the image period for the first field is ended before the switch 23-1 is connected to b. Furthermore, the level of each of the RE2 and RE3 is lowered so as to disable all of the memories. Then, reading of the second field is performed. First, similarly to the process for the first field, the level of the RE2 is raised at t12 so as to transmit the pulse RSTR2. At this time, the connection established between the switch 23-1 and b is maintained, causing no signal to be transmitted to 10 and 11. Then, the level of the RE1 is raised at t14 so as to transmit the pulse RSTR1. At t15, 1H later t14, the switch 23-1 is connected to a, causing output (G1, B) from the memory 20 to be transmitted from address zero to the D/A converter 11. Furthermore, data (G2, B) in 21 is transmitted to the D/A converter 12 at t15. Thus, the second field is read by delaying by 1 H in order to secure interlace from the signals in the first field. That is, signals read from the second row of the memory 20 to be transmitted to 10 are significant, while signals read from the (X+1)-th row of the memory 21 to be transmitted to 11 are significant. Therefore, assuming that the length of a period from t7 to t8 is mH, the length of a period from t13 to t14 is (m−1)H. When reading of the final row z has been completed at t16, the switch 23-1 is connected to b. Furthermore, the level of the RE3 is raised so as to transmit pulse RSTR3, causing the output supplied to 11 to be switched over to the first column of the memory 22. Then, the switch 23-1 is connected to C at t17 so as to switch over the output to be supplied to 10 to the memory 21. Simultaneously, the pulse RSTR2 is transmitted so that data reading is commenced at the first row of the memory 21. At this time, the period in which the REl is enabled is nH which is the same as that in the first field. Therefore, the output is switched over to the memory 21 after reading of the memory 20 has been completed. Therefore, the lack of information at the boundary can be prevented. On the other hand, a period t13 to t17 from the first transition of the VP shown in FIG. 11 (1) is (m+n−1)H which is shorter than the length from t7 to t10 Of the first field by 1H.

Then, outputting is continued to t18 at which the switch 23-1 is connected to b so that the switch 23-1 is opened. Simultaneously, the level of each of the RE2 and the RE3 is lowered, causing the memories 21 and 23 to be brought into a high impedance state. Thus, the output operation of the image signal is completed.

In the second field, reading of data (G2, B) is commenced at t15, while reading of data (G2, R) is commenced at t14. Therefore, the read commencement time is delayed by 1H. Furthermore, a false signal is undesirably read out because data (G1, R) is not present at the time of reading data (G2, B) from the final row. Therefore, reading of data (GI, R) and (G2, B) in the second field is reduced by 1H from the image period for the significant pixels. Simultaneously, if the image period is different between the first field and the second field, a partial flicker takes place on the final row (row Z). Therefore, the first field is also arranged in such a manner that the period in which output signal is transmitted is shortened by 1H for both (G1, R) and (G2, B). That is, assuming that the length of the period from t17 to t18 is OH, the period from t10 to t11 is (o−1)H. Therefore, time t7 to t11 and time t13 to t18 from the first transition of the VP are (m+n+o−1)H for both first and second fields. Furthermore, a false signal will be generated because reading of the memory 20 in the first field is performed earlier by 1H. Therefore, the output form the memory 20 from t10 to t15 is opened by a switch 23-2 shown in FIG. 12 so as to delete the subject data.

Furthermore, signals except for period (n+o−1)H may be muted in a period from t8 to t11 and a period from t15 to t18 by using a blanking pulse as shown in (18) so as to delete the false signal and to prevent the flicker. As an alternative to the deletion of the false signal, a method may be employed in which the row Z in the memory 22 is read twice successively so as to output to the final row of the memories 21 and 22 in the first field and the memory 21 in the second memory.

On the other hand, setting of the write completion timing, read commencement timing, timing of the completion of reading the first field and timing of the commencement of reading the second field may be arbitrarily made to suit the specifications of the employed serial memory or the image pickup device to which the present invention is adapted. By approximating the timing of each of the operations, the photographing speed can be raised.

Figure 13:
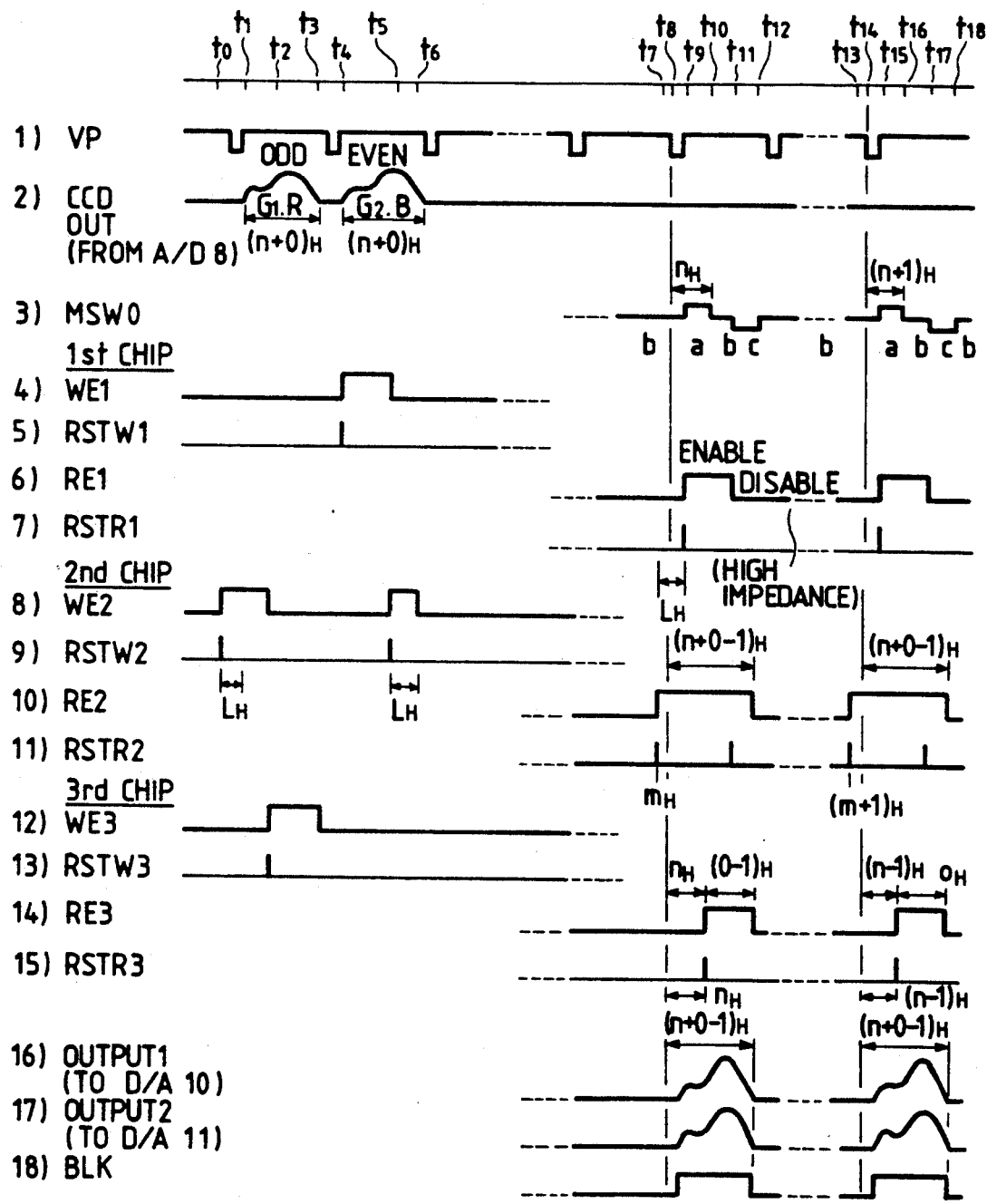
FIG. 13 is a timing chart of the memory shown in FIG. 12.

Furthermore, by completing the switching of the switches 23-1 and 23-2 within the H-blanking period of the image signal, generation of undesirable noise can be prevented. FIGS. 13 (16) and (17) are timing charts of each of the outputs (outputs to the D/A converters 10 and 11).

Figure 9:
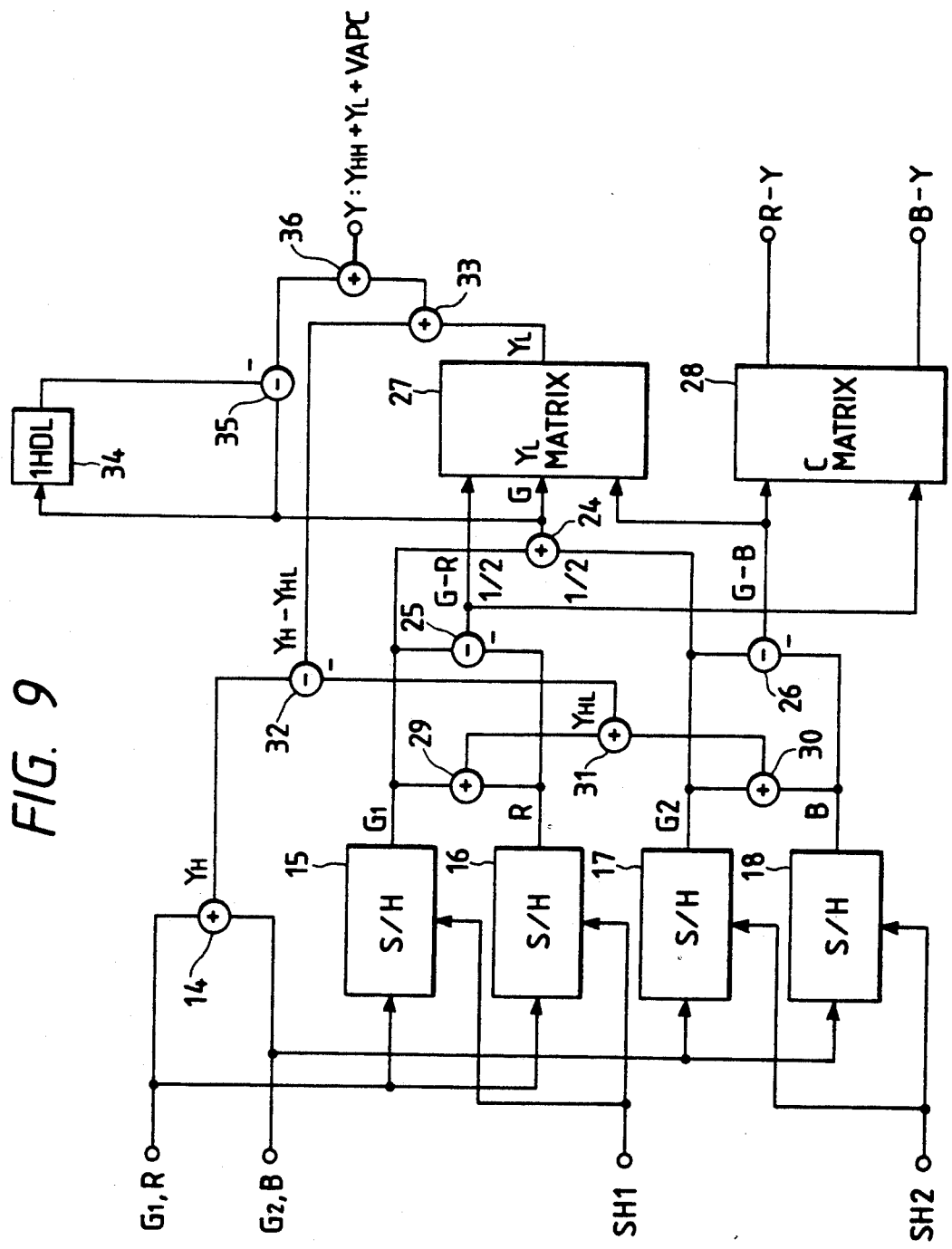
FIG. 9 is a block diagram which illustrates a matrix circuit 19 according to the first embodiment of the present invention.

The digital signals transmitted to the D/A converters 10 and 11 as described above are converted into analog signals (G1, R) and (G2, B) before they are transmitted to the ensuing analog signal processing circuits. First, in 14, the signals (G1, R) and (G2, B) are added to each other so that luminance signal YH having a high band component is deduced. In 15 and 16, each of the signals (G1, R) and (G2, B) is sample-held by the SH1 pulse so that G1 and G2 are deduced. Then, in 17 and 18, the signals (G1, R) and (G2, B) are sample-held by SH2 pulse so that R and B signals are deduced which are then transmitted to the matrix circuit portion 19. In 19, G1 and G2 are averaged by the adder 24 as shown in FIG. 9 so that G is deduced before the difference between G1 and R and the difference between G2 and B are calculated by subtracters 25 and 26 so that G - R and G - B are deduced. Then, G - R, G, G - B are transmitted to a YL MATRIX 27 so that reduced luminance signal YL is deduced, while G - R and G - B are transmitted to a C MATRIX 28 so that chrominance signals R - Y and B - Y are deduced.

On the other hand, adders 29 and 30 add G1 to R and also add G2 to B before an adder 31 adds the outputs from the adders 29 and 30 to each other so that reduction component YHL of the output YH from the adder 14 is deduced. Furthermore, a subtractor 32 deduces the difference YH - YHL between YH and YHL. The output G from the adder 24 is made to be a signal delayed by 1H by a 1H delay line 34 before the difference from G, that is, VAPC denoting the vertical high band component, is deduced by a subtracter 35. Then, YL and YH - YHL are added to each other by an adder 33 before VAPC is added by an adder 36 so that luminance signal Y: YHH+YL+VAPC is obtained.

As described above, according to this embodiment, the memory can further simply be controlled by using the serial memory 9 so that the memory control 12 can easily be designed.

Furthermore, if a high speed a synchronous read/write enable high speed FIFO serial memory is employed, reading (at t6 in a case of the memory 21) can be commenced during the memory writing operation (in a period from t1 to t4 in a case of the memory 21). Therefore, the system operational speed can be raised further.

A modification to this embodiment will now be described.

Figure 12:
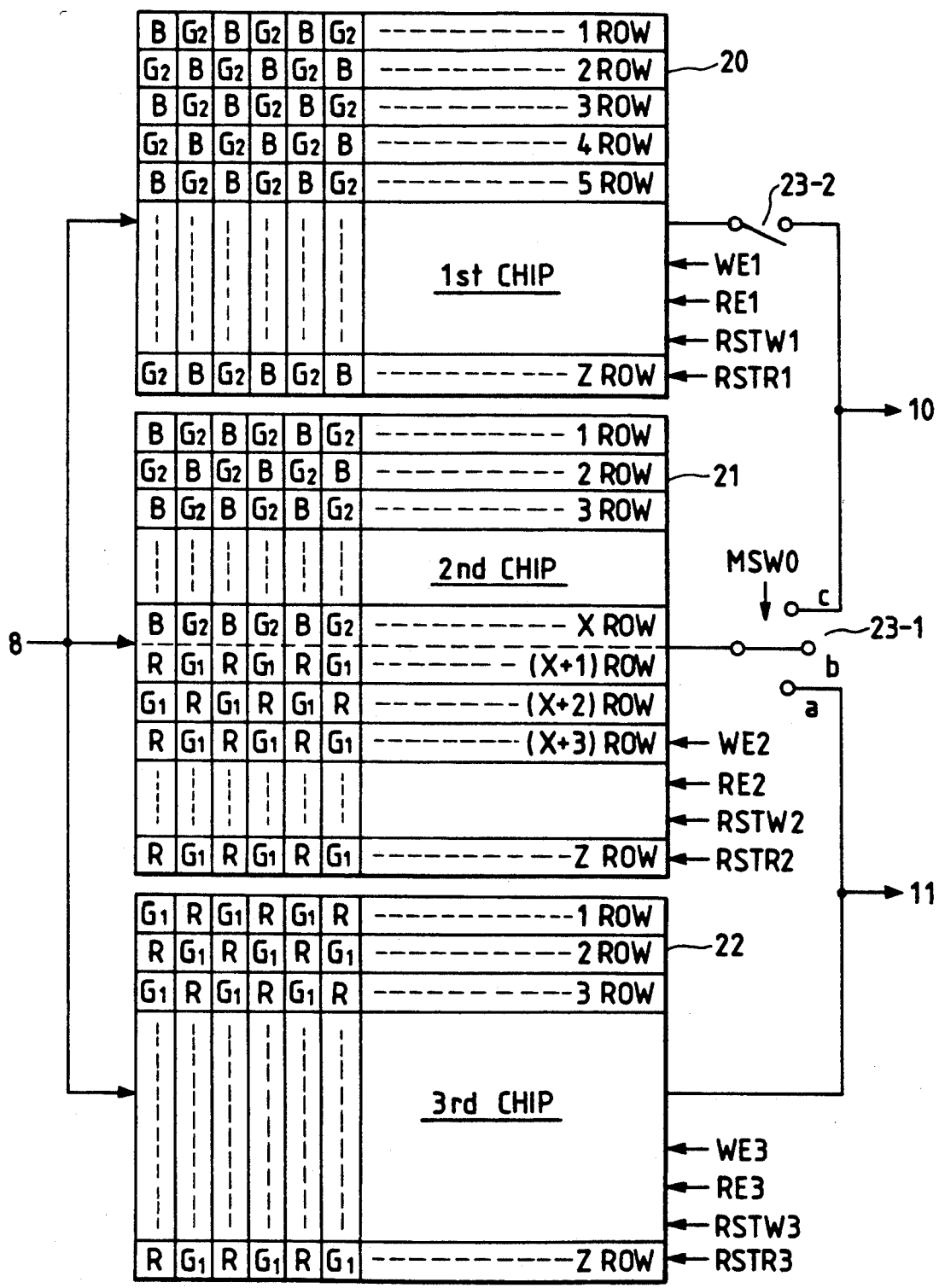
FIG. 12 is a second structural schematic view which illustrates the serial memory 9 according to the first embodiment of the present invention.

The overall structure according to this modification is arranged to be the same as that shown in FIG. 8. However, in the flow of the signal transmission subsequently to the memory, signals designated in parentheses are transmitted. Description will now be made with reference to FIGS. 12 and 13. First, as shown in FIG. 13 (2), supply of the output from the CCD 1 through the A/D converter 8 is commenced at t1. Therefore, the above-described output is stored starting form the (X+1)-th row of the memory 21 in such a manner that the level of the write enable signal WE2 shown in FIG. 13 (8) is raised at t0 which is 1H before it so as to be the enable state. Then, writing is commenced from address zero (the left end of the first row of the memory 21 shown in FIG. 12) after the write address of the memory has been reset in response to the write reset signal RSTW2, where 1 =x. As a result, (G1, B) signals of the CCD output (odd field) are stored as illustrated subsequently to the (X+1)-th row on the memory 21 shown in FIG. 8. Then, the level of the WE2 is lowered at t2 at which the storage capacity of the memory 21 is filled. As a result, the memory 21 is disabled. At this time, the memory 22 is enabled in response to the write enable signal WE3 shown in (12) so that output signals from address zero in the CCD odd field ensuing t2 is stored in the memory 22 as shown in FIG. 12 in accordance with the output of the pulse RSTW3 shown in (13). The level of the WE3 is lowered from t3 at which the image period in the odd field is completed so that the memory 22 is disabled. Then, the level of WE1 shown in (4) is raised at t4 at which the image period of the even field is commenced. As a result, data of the signal (G2, B) is written until t5 at which the capacity of the memory 20 is filled. At t5, the level of the WE1 is lowered so that the memory 21 is disabled. Then, the level of the WE2 shown in (8) is again raised so that the pulse RSTW2 shown in (9) is generated. As a result, even field image signals from t5 are written from the first row of the memory 21 to the (X - 1)-th row of the same. Simultaneously with completion of the even field image signal at t6, the memory 21 is disabled in response to the WE2 so that the writing operation is completed. An operation of reading data from the serial memory 9 will now be described. First, the switch 23 - 1 is connected to b so as to be opened. At t7, the level of the read enable signal RE2 shown in (10) is raised so that the read reset pulse RSTR2 is transmitted to commence reading of the memory 21. At this time, the switch 23-1 is opened, the level of each of the RE1 and RE2 is low and the outputs from the memories 20 and 22 are high impedance, and no signal is transmitted to 10 and 11. Then, the level of the RE1 is raised at t9 so that the RSTR1 pulse is transmitted. As a result, data in the memory 20 is read out so as to transmit it to 10. Simultaneously, the switch 23-1 is connected to a so that the output read out is supplied to 11. At this time, since the address of the memory 21 proceeds by 1H, the address has been proceeded by the degree corresponding to the storage made from t5 to t6 of the WE2 shown in (8). Therefore, since the address shows the (X+1)-th row where there is data of (G1, R) of the memory 21 shown in FIG. 12, the signal (G1, R) is transmitted to 11.

Then, the switch 23-1 is connected to b at t10 so as to be opened. Simultaneously, the level of the RE3 is raised so that the pulse RSTR3 is transmitted. As a result, reading of data from the memory 22 is commenced. As a result, data (G1, R) which is the output from the memory 22 is transmitted to 11. At t11, the switch 23-1 is connected to c, and simultaneously the pulse RSTR2 is again transmitted so that the signals are transmitted from address zero of the memory 21 to 10. When the image period in the first field has been ended at t12, the switch 23-1 is connected to b so that the level of each of the RE2 and RE3 is lowered. As a result, each of the memories is disabled.

Then, reading of the second field is performed. Similarly to the first field, the level of the RE2 is raised at t13 so that the pulse RSTR2 is transmitted. At this time, the connection established between the switch 23-1 and b is maintained. Therefore, no signal is transmitted to 10 and 11. At t15, the switch 23-1 is connected to a, causing the level of the RE1 to be raised. As a result, the pulse RSTR1 is transmitted. Therefore, the output (G2, B) from the memory 20 is, from address zero, transmitted to 10, while data (G1, R) in the memory 21 is transmitted to 11. However, it is necessary for the second field to perform reading while delaying by 1H for the purpose of having interlace with respect to the signal in the first field. That is, it is necessary to read the output to be supplied to 11 from the second row of data (G1, R), that is, the (X+2)-th row. Therefore, assuming that the length of the period from t7 to t8 is mH, the length of the period from t13 to t14 is (m+1)H. By making the period from ts to t9 to be the same as the period from t14 to t15, the address of the memory 21 is set to the left end of the second row (X+2) of data (G1, R). Then, the switch 23-1 is connected to b at t16 so that the level of the RE3 is raised. As a result, the pulse RSTR3 is transmitted. According to this modification, t16 is set in such a manner that a period from t14 to 16 is (n−1)H. Thus, it is shorter than the period from t8 to t10 in the first field by 1H Therefore, the period from t7 to t10 and that from t13 to t16 is the same as (n+m)H. Therefore, the subject point is the point at which reading of data (G1, R) of 2 has been completed at t16. That is, at t16, data (G1, R) is transmitted to 11 from the 2nd Chip output while preventing lack of information at the boundary to the Chip output. Therefore, the switch 23-1 is connected to c at t17 so as to lower the level of the RE1. As a result, the pulse RSTR2 is again transmitted. Therefore, the output to be supplied to 10 is switched over from the memory 20 to 21, the thus selected output being continued to t18. At t18, the switch 23-1 is connected to b so as to be opened. Simultaneously, the level of each of the RE2 and RE3 is lowered so that the memories 21 and 22 are brought to high impedance state. Thus, the output operation of the image signal is completed. In the second field, although reading of data (G2, B) is commenced from the first row in the second field, reading of data (G1, R) is commenced from the second row. Therefore, the reading time delays by 1H, causing a false signal to be read out since there is no (G1, R) data at the time of reading the final row of data (G2, B). As a result, reading of data (G1, R) and (G2, B) in the second field is reduced by a degree corresponding to 1H in comparison to the image period of the significant pixel. Furthermore, if the image period is different from that of first field, undesirable partial flicker takes place. Therefore, reading of data (G1, R) and (G2, B) in the first field is reduced by a degree corresponding to 1H. That is, assuming that the length from a period from t16 to t18 is 0H, a period from ts to t12 and that from t14 to t16 are the same as (n+0−1)H in both first and second fields. Furthermore, the signal may be muted in the periods other than the periods from t9 to t12 and that from t15 to t18 in response to the blanking pulse shown in (18) for the purpose of deleting false information and preventing the flicker. As an alternative to the deletion of the false information, an approximation process may be employed in which the row Z of the memory 22 is read twice successively. On the other hand, setting of the write completion timing, read commencement timing, timing of the completion of reading the first field and timing of the commencement of reading the second field may be arbitrarily made to suit the specifications of the employed serial memory or the image pickup device to which the present invention is adapted. By approximating the timing of each of the operations, the photographing speed can be raised. Furthermore, by completing the switching of the switches 23-1 within the H-blanking period of the image signal, generation of undesirable noise can be prevented. FIGS. 13 (16) and (17) are timing chart of each of the outputs (outputs to the D/A converters 10 and 11). The digital signals transmitted to the D/A converters 10 and 11 as described above are converted into analog signals (G2, B) and (G1, R) before they are transmitted to the ensuing analog signal processing circuits. First, in the adder 14, the signals (G1, R) and (G2, B) are added to each other so that luminance signal YH having a high band component is deduced. In S/H 15 and 16, each of the signals (G2, B) and (G1, R) is sample-held by the SH1 pulse so that G2 and G1 are deduced. Then, in S/H 17 and 18, the signals (G2, B) and (G1, R) are sample-held by the pulse SH2 so that B and R signals are deduced which are then transmitted to the matrix circuit portion 19. The ensuing operation of the matrix circuit 19 is arranged similarly to the above-made description.

According to this embodiment, although the serial memory is employed as the memory, a random access memory may also be employed. Furthermore, individual memories may be employed to correspond to the signals G1, G2, R and B.

FIG. 14 illustrates the arrangement of color filters of the solid image pickup device of the color image pickup apparatus according to a second embodiment of the present invention. As shown in FIG. 14, the color filters may comprise Ye, Mg, Cy, Gr (yellow, magenta, cyane and green) complementary color type filters. The Mg, Cy, Ye and Gr filters are formed into a sampling structure since they are disposed at the horizontal directional pitch of 2PH, the vertical directional pitch of 2Pv and the horizontal directional offset quantity is PH. Furthermore, the position at which is generated the carrier component of the image pickup device, in which the thus-structured color filter array is disposed, is arranged to be the same as that according to the first embodiment shown in FIG. 6. Furthermore, the optical low-pass filter according to this embodiment is arranged similarly to that shown in FIG. 7A. In a case of a solid image pickup device having about 760 effective pixels in the horizontal direction, about 480 effective pixels in the vertical direction and an aspect ratio of 3:4, it holds the following relationship:

$$1.2PH = Pv \quad (7)$$

Figure 15A:
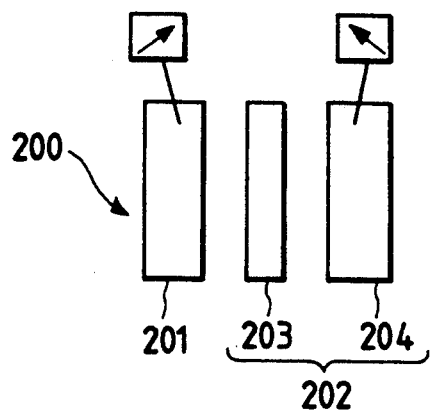
FIGS. 15A and 15B illustrate the operation of the optical low-pass filter for use according to the second embodiment of the present invention.
Figure 15B:
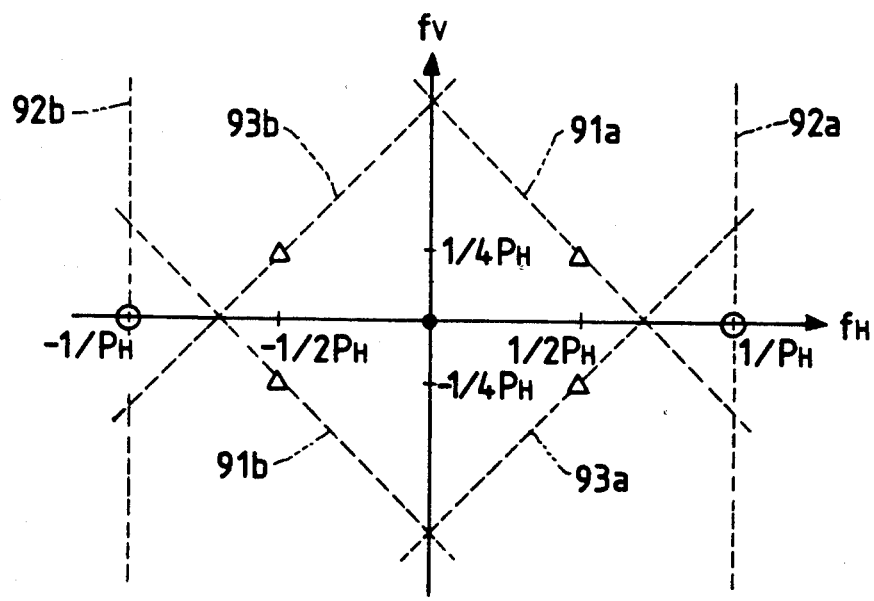

According to this embodiment, the relationship is arranged as follows:

$$P_1 = \frac{12\sqrt{2}}{17} P_H, P_2 = \frac{P_H}{2} \quad (8)$$

where symbol P1 denotes the distance in which the incidental beam is separated by the first optical member 31 shown in FIG. 7A and the third optical member 33 and P2 denotes the distance in which the incidental beam is separated by the second optical member 32. The transfer characteristic displayed by means of a two-dimensional frequency space is shown in FIGS. 15A and 15B. Dotted lines 91a, 91b, 92a, 92b, 93a and 93b show the frequencies at which a optical low-pass filter 200 traps. The optical low-pass, filter 200, as shown in FIGS. 15A and 15B, comprises a first optical member 201 comprising a birefringence plate and a second optical member 202 comprising a phase plate 203 and a birefringence plate 204. The birefringence plate 201 separates an incidental light beam into two light beams in a direction of 45° from the horizontal direction by a distance P. The linearly polarized light beam emitted from it is converted into a circularly polarized light beam by the phase plate 203 before being separated in a direction of an angular degree of 135° from the horizontal direction by the birefringence plate 204 by the distance P. As a result, it is divided into four points of a rhomboid one side of which is P. The MTF character of the above-described optical filter 200 is expressed by means of the two-dimensional frequency space. Dotted lines 121a, 121b, 123a and 123b of FIG. 15B show the frequencies at which the optical low-pass filter traps. As can be seen from FIG. 15B, carrier frequencies of the chrominance signal are trapped. Therefore, the reflection distortion can satisfactorily be prevented such that the decay of the MTF within −15 dB takes place in the frequency region of $|fH| = \frac{1}{2}PH$. As a result, a resolution substantially approximating the limit resolution frequency $\frac{1}{2}PH$ can be secured.

As can be clearly seen from FIGS. 15A and 15B, all of the carrier frequencies of the luminance and chrominance signals can be trapped. Consequently, the reflection distortion can be satisfactorily prevented. Furthermore, calculating Equations (4), (7) and (8), the decay of the MTF within 15 dB takes place in a region which is about 96% of $|fH| \leq \frac{1}{2}PH$. As a result, a resolution substantially approximating the limit resolution frequency of $\frac{1}{2}PH$ can be secured.

According to both of the first and the second embodiments, the optical low-pass filters are employed for both the luminance and chrominance signals, the optical low-pass filters being capable of trapping at the carrier frequency so as to make the MTF to be zero. However, the present invention is not limited to the carrier frequency. Any frequencies near the carrier frequency can be employed, but the MTF of which can be sufficiently approximated to zero. In order to obtain it, the conditions (2) and (3) must be met.

A method of obtaining the image signal according to this embodiment will now be described.

Figure 16:
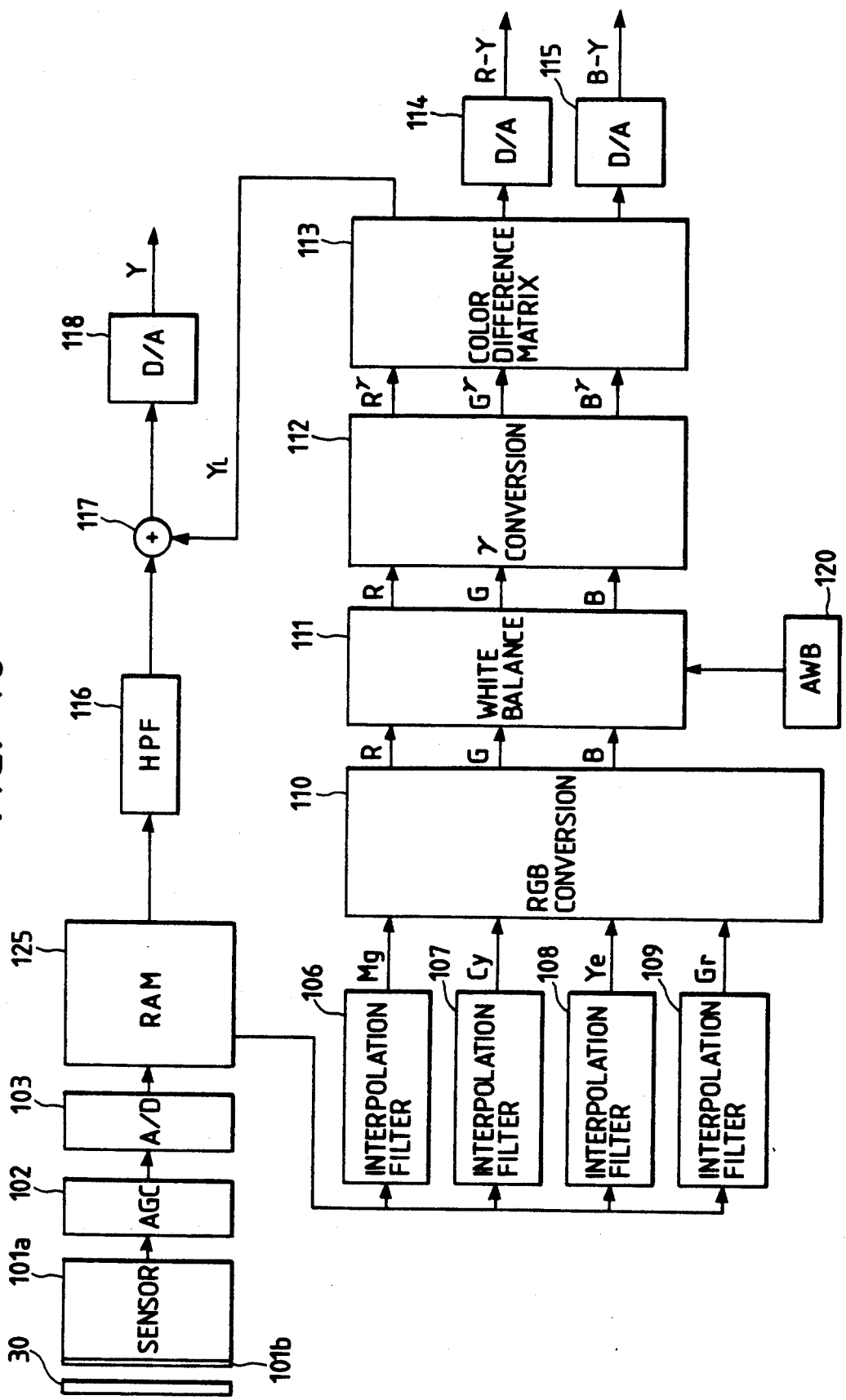
FIG. 16 illustrates the overall structure according to the second embodiment of the present invention.

FIG. 16 is a block diagram of the signal process according to this embodiment.

A CCD sensor 101a has a color filter array 101b composed of color filters of four types as shown in FIG. 14. An image signal read out at each pixel by interlace scanning from the sensor 101a is subjected to a gain adjustment process by an AGC (Automatic Gain Adjustment Circuit) 102 before it is A/D converted by an A/D converter 103 at a timing which is in synchronization with the reading clock. It is preferable that the A/D converter 103 has a linear characteristic for preferably performing the color forming process to be performed later. Furthermore, it acts with 8 bits or more in order to reduce the quantization error. The signal, which has been A/D converted, is written in a random access memory 125 so as to be subjected to a two-dimensional signal process to be performed later, the signal being read out from the random access memory 125.

The luminance signals are read out from the random access memory 125 in a sequential order which corresponds to the reading of the pixels by the CCD. Furthermore, its high band components are detected by a high-pass filter 116 before it is added to the low luminance component YL obtainable from a method to be described later in an adder 117. Then, it is D/A converted by a D/A converter 118 before it is transmitted.

On the other hand, signals corresponding to the Mg, Cy, Ye and Gr color filters are read out from the random access memory before they are supplied to four interpolation filters 106, 107, 108 and 109. As a result, Mg, Cy, Ye and Gr color signals, which have been made to coincide, are obtained.

The color signals thus-obtained are supplied to an RGB conversion portion 110 so as to be converted into R, G and B signals as a result of the following matrix calculation:

$$\begin{bmatrix} R \\ G \\ B \end{bmatrix} = A \begin{bmatrix} Mg \\ Gr \\ Cy \\ Ye \end{bmatrix}$$

The matrix A is formed into an optimized matrix constituted by three rows and four columns in order to approximate the spectrum characteristics Mg ($\lambda$), Gr ($\lambda$), Cy ($\lambda$) and Ye ($\lambda$) of Mg, Gr, Cy and Ye of the sensor 101a to ideal spectrum characteristics R ($\lambda$), G ($\lambda$) and B ($\lambda$) defined by the NTSC.

Then, a white balance portion 111 performs a white balancing operation in such a manner that R, G and B are converted into $\alpha$R, G and $\beta$B in accordance with color temperature information obtained from a white balance sensor 120.

Then, a $\gamma$-conversion portion 112 performs a $\gamma$-conversion of the RGB signal by means of a table conversion.

A chrominance matrix portion 113 performs a conversion in accordance with the standard of the NTSC as follows:

$$\begin{bmatrix} Y_L \\ R-Y \\ B-Y \end{bmatrix} = \begin{bmatrix} 0.30 & 0.59 & 0.11 \\ 0.70 & -0.59 & -0.11 \\ 0.30 & -0.59 & 0.89 \end{bmatrix} \begin{bmatrix} R\gamma \\ G\gamma \\ B\gamma \end{bmatrix}$$

As a result, the above-described luminance reduction component YL, chrominance signals R - Y and B - Y are generated. The chrominance signals R - Y and B - Y are subsequently D/A converted by D/A converters 114 and 115 so as to be transmitted. The luminance reduction component YL is added to the high band component of the luminance detected by the high-pass filter 116 as described above before it is D/A converted by the D/A converter 118 so as to be transmitted.

The structure of this embodiment may be structured by software by using a DSP (Digital Signal Processor) or the like as an alternative to a structure formed into a hard-wired shape in accordance with the block diagram.

Although the first and second embodiments are capable of recording a still image, they may be adapted to video recording such as the video camera.

As described above, according to this embodiment of the present invention, a color image pickup device can be provided in which the generation of false color can be prevented in both of the horizontal and the vertical directions and in which a resolution of the luminance signal approximated to the theorical limit can be obtained.

Furthermore, since the frequency of the luminance and the chrominance signals to be trapped is relatively high, the thickness and the size of the optical low-pass filter can be reduced. As a result, a thin and compact optical low-pass can be filter can be employed. Therefore, the size of the overall body of its optical system can be reduced.

Furthermore, by employing a memory, the output timing from the odd field and the even field can be desirably set. Therefore, if the structure according to the present invention is adapted to, for example, a still video camera, the frame photographing can be performed while necessitating the field head. Consequently, a reliable still video camera with overall reduced cost can be manufactured.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A color image pickup apparatus comprising: an image pickup device in which a color filter array is provided, said color filter array being composed of color filters of three or more colors disposed in such a manner that, assuming that the horizontal scanning directional pitch of said color filters is PH and the vertical scanning directional pitch of the same is Pv, said color filters of the same color are disposed at a horizontal scanning directional pitch of 2PH and a vertical scanning directional pitch of 2PV while being offset by PH in the horizontal scanning direction.

2. A color image pickup apparatus according to claim 1, wherein an output from said image pickup device is temporarily recorded in a memory so that frame information is formed in response to a read signal from said memory.

3. A color image pickup apparatus comprising: an image pickup device having an optical low-pass filter provided on the front surface thereof, said optical low-pass filter being constituted by laminating a first optical member for dividing a light beam made incident upon by distance P1 while making an angle of 45° from the horizontal scanning direction into two light beams, a second optical member for dividing a light beam made incident upon by distance P2 while making an angle of 90° from the horizontal scanning direction into two light beams and a third optical member for dividing a light beam made incident upon by distance P1 while making an angle of 135° from the horizontal scanning direction into two light beams, said optical low-pass filter disposed meeting the following conditions:

$$\frac{3\sqrt{2}\, P_H P_V}{2(P_H + 2P_V)} < P_1 < \frac{3\sqrt{2}\, P_H P_V}{P_H + 2P_V} \text{ and}$$

$$P_2 < P_H.$$

4. A color image pickup apparatus according to claim 3, wherein an output from said image pickup device is temporarily recorded in a memory so that frame information is formed in response to a read signal from said memory.

5. A color image pickup apparatus comprising:
a color filter array, from which the carrier of a chrominance signal is not generated and which is disposed on the horizontal frequency axis in a 2D-frequency space arranged in the horizontal direction and the vertical direction; and
an optical low-pass filter for trapping a portion in the vicinity of the position of the carrier of a luminance signal and that of a chrominance signal in a 2D-frequency space arranged in the horizontal direction and the vertical direction, wherein said color filter array and said optical low-pass filter are disposed on the front surface of said image pickup device.

6. A color image pickup apparatus according to claim 5, wherein an output from said image pickup device is temporarily recorded in a memory so that frame information is formed in response to a read signal from said memory.

7. A color image pickup apparatus comprising:
an image pickup device in which the horizontal directional pixel pitch is PH and the vertical directional pixel pitch is Pv;
a color filter array formed into an offset structure and provided for said image pickup device, said color filter array being composed of color filters of three or more colors disposed in such a manner that said color filters of the same color are disposed at a horizontal scanning directional pitch of 2PH and a vertical scanning directional pitch of 2Pv while being offset by PH in the horizontal scanning direction.
an optical low-pass filter composed of; a first optical member for dividing an incidental light beam into two light beams away from each other in a direction of 45° from the horizontal direction by distance P; and a second optical member for dividing an incidental light beam into two light beams away from each other in a direction of 90° from the direction in which said first optical member divides the light beam by distance P, said optical low-pass filter being provided for an image pickup optical system and meeting the following conditions:

$$\frac{3\sqrt{2}\, P_H P_V}{2(P_H + 2P_V)} < P < \frac{3\sqrt{2}\, P_H P_V}{P_H + 2P_V}.$$

8. A color image pickup apparatus according to claim 7 further comprising a signal processing means constituted by a memory for temporarily storing an output from said image pickup device and a control portion for controlling said memory, said signal processing means forming frame information from the contents stored in said memory.

* * * * *

UNITED STATES PATENT AND TRADEMARK OFFICE
CERTIFICATE OF CORRECTION

PATENT NO. : 5,146,320
DATED : September 8, 1992
INVENTOR(S) : Akihiko Shiraishi It is certified that error appears in the above-indentified patent and that said Letters Patent is hereby corrected as shown below:

```
Col. 1, line 15, delete "in"
Col. 2, line 29, after "85" insert --%--
Col. 2, line 53, change "2PH" to -- 2Pv --
Col. 3, line 43, delete ";"
Col. 5, line 13, change"ph" to --PH,± --.
        line 21, change "fh" to --fH --.
Col. 5, line 53, change "is" to -- if--
Col. 6, line 64, change "from" to -- of --
Col. 7, line 61, delete "at to"
Col. 8, line 14, change "Kh" to --KH --
Col. 8, line 53, change "ts" to --t8 --
Col. 12, line 32, change "ts" to --t8--
Col. 13, line 2, change "ts" to -- t8--
Col. 13, line 3, change "t16" to --t18--
Col. 13, line 23, change "chart" to --charts--
Col 14, line 16, change "a" to --an--
Col. 15, line 28, change "thus-obtained" to -- thus obtained--
Col. 16, line 34, change "particularly" to --particularity--
```

Signed and Sealed this

Fifteenth Day of March, 1994

BRUCE LEHMAN

*Attest:*

*Attesting Officer*     Commissioner of Patents and Trademarks